Dec. 23, 1930.　　　F. DONOHUE, JR　　　1,786,338

PROPELLER MECHANISM FOR AIRCRAFT

Filed Aug. 16, 1929　　　3 Sheets-Sheet 1

WITNESSES

INVENTOR
Frank Donohue Jr.
BY
ATTORNEYS

Dec. 23, 1930.  F. DONOHUE, JR  1,786,338
PROPELLER MECHANISM FOR AIRCRAFT
Filed Aug. 16, 1929   3 Sheets-Sheet 3

WITNESSES
Frank M. Pratt
A. J. Henry

INVENTOR
Frank Donohue Jr.
BY
Munn & Co.
ATTORNEYS

Patented Dec. 23, 1930

1,786,338

UNITED STATES PATENT OFFICE

FRANK DONOHUE, JR., OF NEW YORK, N. Y.

PROPELLER MECHANISM FOR AIRCRAFT

Application filed August 16, 1929. Serial No. 386,267.

This invention relates to propeller mechanisms for aircrafts.

It is among the objects of the present invention to provide an improved propeller transmission mechanism which overcomes the natural difficulties found in the direct connection of a propeller with the drive shaft of the power plant.

A further object of the present invention is to provide propeller transmission mechanism for aircrafts which will rotate the propeller at a speed less than that of the drive shaft of the power plant.

A further object of the present invention is to provide propeller transmission mechanism for aircrafts by which a pair of oppositely pitched propellers may be rotated in opposite direction by a single power plant.

A further object of the present invention is to provide a propeller transmission mechanism adapted to rotate a pair of oppositely pitched propellers at oppositely proportioned speeds, whereby the speed of one propeller will be inversely proportional to the speed of the other propeller.

A further object of the present invention is to provide a double propeller system for aircrafts in which propellers are driven from a single drive shaft and in which the reactance of the propellers is balanced therebetween.

Other objects of the present invention include the combination and interrelation of parts whereby the whole forms a novel, simple and improved construction well designed to meet the demands of economic manufacture.

Other objects and features of the present invention will be apparent from a consideration of the following specification taken in conjunction with the accompanying drawings, in which Figure 1 is a fragmentary perspective view of an aircraft embodying one form of the present invention;

Figure 1:
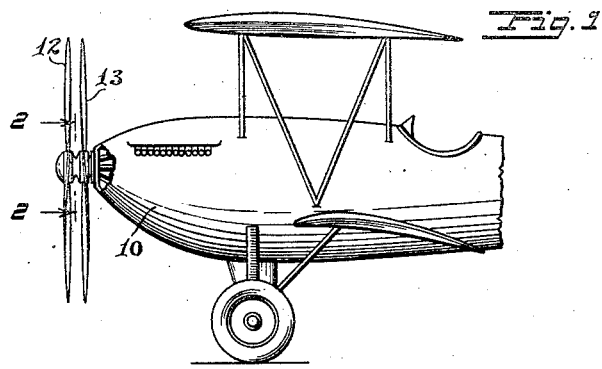

Referring more particularly to the drawings, it will be seen from Fig. 1, that the device is applicable to airplanes or similar aircrafts, the invention being illustrated in connection with the airplane indicated by the numeral 10 in said figure.

Figure 2:
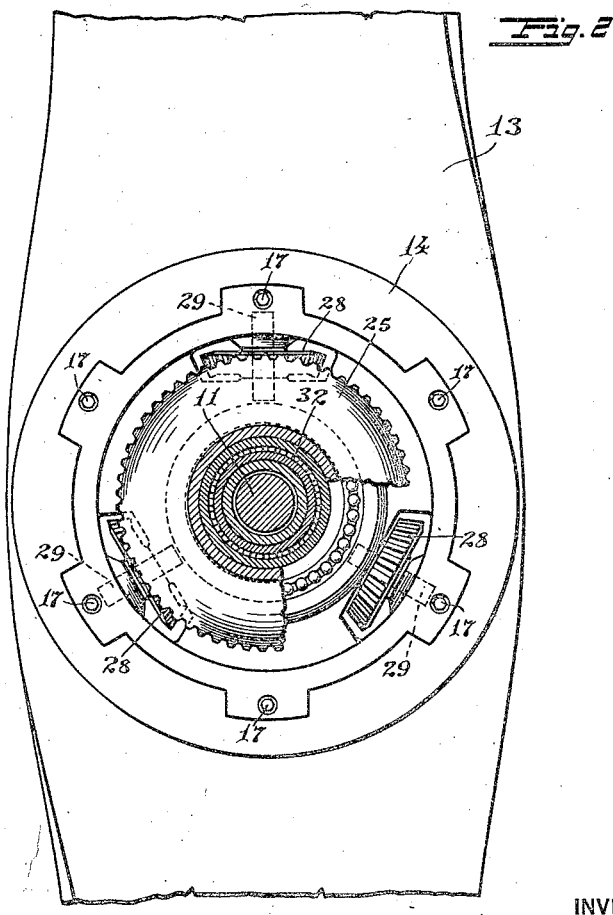
Fig. 2 is a sectional view taken on lines 2—2 of Fig. 1.
Figure 3:
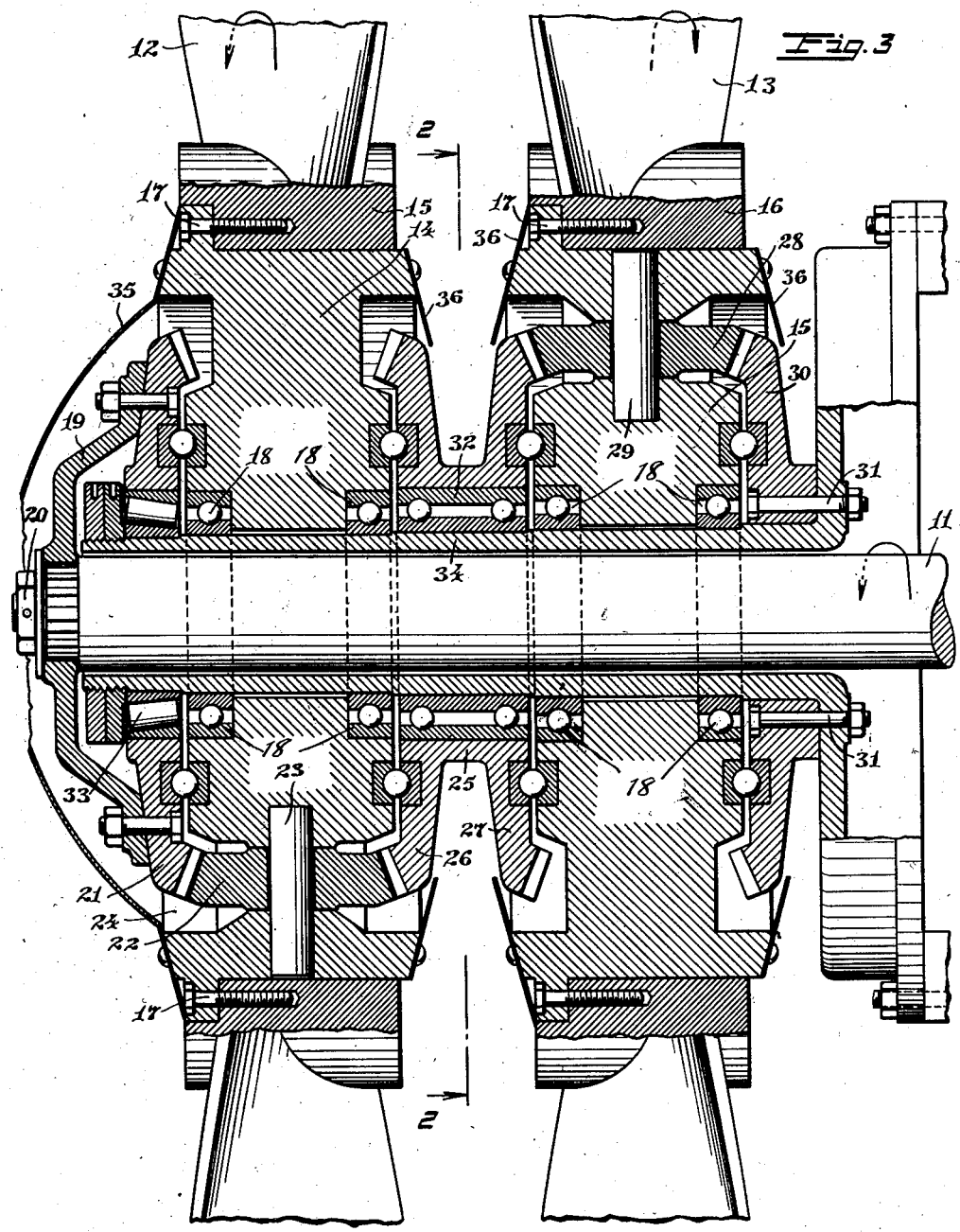
Fig. 3 is a detail enlarged sectional view of that form of the present invention shown in Figs. 1 and 2.
Figure 4:
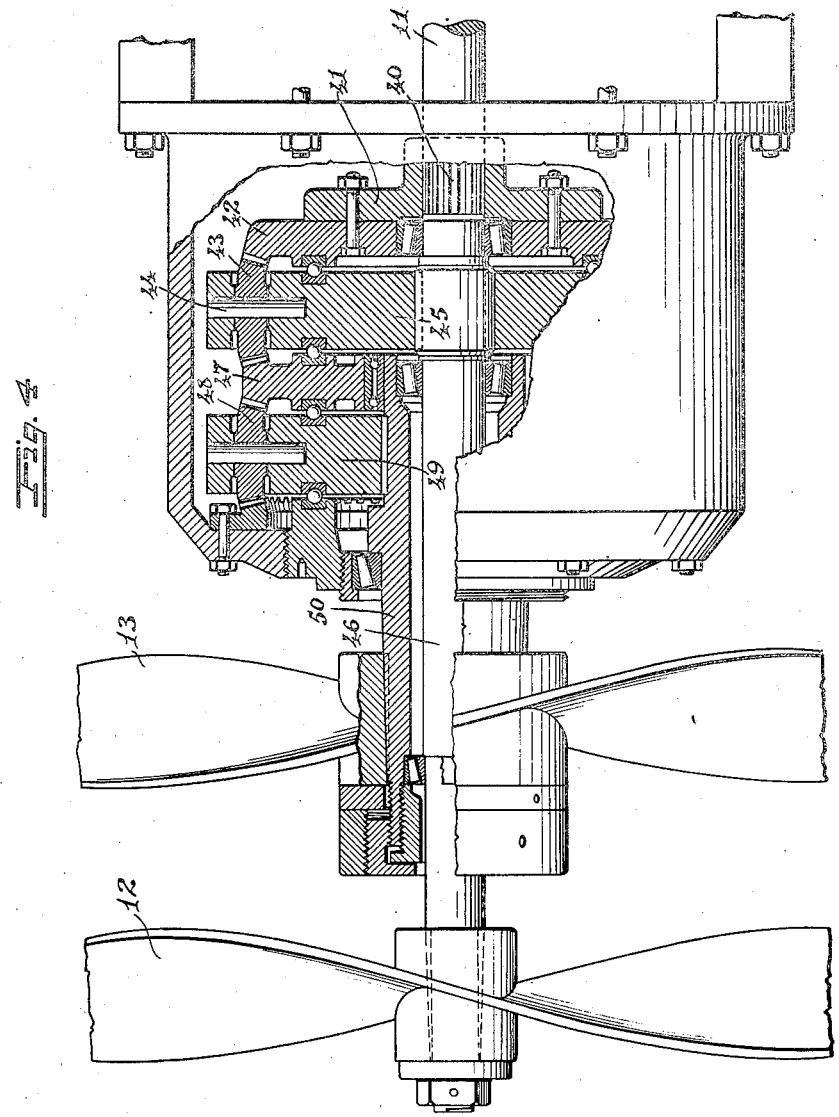
Fig. 4 is a view partly in section showing a modified form of the present invention.

The airplane or similar craft is provided with the conventional power plant (not shown) and preferably is of the high speed internal combustion engine type including a single drive shaft, as indicated at 11 in Figs. 2, 3 and 4. The drive shaft 11 of the power plant is adapted to rotate in opposite directions, two or more oppositely pitched propellers, as indicated by the numerals 12 and 13. It will be seen that the propellers are axially alined for rotation about a common axis and that the pitch of one is opposite to the pitch of the next adjacent propeller so that in combination with the natural translatory moments of the propellers, there is a reactance therebetween whereby the summation of such translatory moments is greater than the summation of such natural moments.

In connection with the present invention, it will be understood that the device is not limited to the single pair of propellers here shown, but that three or any number of propellers may be used, it being understood that adjacent propellers are oppositely pitched. It will further be seen from the following description that the invention is not limited to two or more propellers, it being an important object of the invention to reduce the speed of rotation of the propeller as compared with the speed of rotation of the driving shaft 11; thus with the present mechanism only a single propeller may be used but its speed will be so reduced that the desired high speed internal combustion engine may be used efficiently therewith. It has been found in aerodynamic research that propeller speeds are most efficient when in a range below that normally imparted thereto by so-called high speed internal combustion engines. In order to produce slower speed engines of the desired horse power, it is necessary to increase the size of the bore and the length of the stroke which obviously necessitates increased structure size, thus increasing the weight per horse power. It is thus desirable to utilize the light-weight, high-speed, short-stroke internal combustion engine motors in aircrafts and the present invention provides means for using such motors without loss of efficiency due to an abnormal propeller speed.

Referring more particularly to that form of the invention shown in Figs. 2 and 3, it will be seen that the propellers 12 and 13 include hubs 14 and 15, respectively. The propeller blades are formed with the hub in any desired manner, such as by the securement of the blade wheels 16 to the hub, by suitable securing bolts 17. Each of the hubs 14 and 15 is shown as including ball-bearing mounting assemblies 18 which may be of any desired form, the invention not being confined to any specific roller mounting for the hubs. For imparting rotation to the hub 14 of the forward propeller 12, the drive shaft 11 includes at its forward end, a plate 19, which is secured for rotation therewith as by a securing nut 20. The plate 19 has bolted thereto a bevel gear 21, which is in driving enmeshment with one or more pinions 22, which pinions are mounted for free rotation upon a shaft 23 carried by the hub 14, the hub 14 being recessed as at 24 to provide for the positioning of the pinions 22. The arrangement may be readily seen to be such that upon rotation of the shaft 11, similar rotation of the gear 21 will result, and the pinions 22 will be rotated about their shafts 23. Between the hubs 14 and 15, a double-faced intermediate bevel gear 25 is provided, the forward face 26 of which enmeshes with the rear side of the pinion 22 while the rear face 27 enmeshes with a similar pinion 28 carried upon the shaft 29 of the hub 15. Enmeshing with the rear face of the pinion 28, there is a rear bevel gear 30 which is stationarily mounted with the motor or aircraft frame as by the securing bolts 31.

The general assemblage of the hubs 14 and 15 together with their pinions, shafts, bearings, etc., is substantially similar. The intermediate double gear 25 is provided with a bearing assemblage 32 while the forward gear 21 is provided with roller bearings indicated at 33. The hub and gear assemblies are carried upon a tubular supporting shaft 34 through which the drive shaft 11 extends. The shaft 34 is preferably formed integral, as illustrated, with the motor or aircraft frame to which the gear 30 is bolted. The assembly also includes a suitable forward casing member 35 and suitable protecting members 36 for the gears 25 and 30. It will be understood, however, that the invention is not confined to the structural details but that changes, modifications and the full use of equivalents throughout may be readily resorted to.

From the foregoing it will be seen that upon rotation of the drive shaft 11, the pinion 22 will be rotated and in normal operation will both rotate the intermediate gear 25 and also planetate thereabout in such manner as to rotate the propeller 12 and drive the gear 25, which in turn will rotate the pinions 28 and through their relation with the fixed gear 30, cause their rotation with the rear propeller 13. It will readily be seen that by the arrangement, the speed of revolution of the propellers 12 and 13 will be materially less than the speed of rotation of the shaft 11. It will further be seen that there will be a balance of the dynamic forces causing the opposite rotation of the propellers and that the speed will be in opposite proportion to the speed of rotation of the other. Thus should the propeller 13 be held stationary or should the first propeller encounter no resistance, the speed of rotation would be one-half the speed of rotation of the shaft 11. Obviously the proportioned speed of the propellers with regard to the drive shaft may be controlled through the design of the interconnecting gears. In actual practice both propellers will be rotated at approximately equal and opposite speeds. The propellers therefore divide their speeds so that each encounters equal resistance and the load on the drive shaft 11 is thus divided between the propellers. The rear propeller 13 will normally operate at a slightly higher speed than the forward propeller due to the fact that it is encountering air already directed by the force of the forward propeller and thus a slight inequality in the speeds of rotation will be maintained. It will be seen therefore that by the use of two propellers in conjunction with the present transmission mechanism, the driving force is divided between the propellers and the speed of rotation of the propellers is less than the speed of rotation of the drive shaft so that maximum efficiency is maintained and so that the load on the propellers is divided, thus balancing the strain therebetween and avoiding the danger of overstrain on the propeller blade.

Referring more particularly to Fig. 4, it will be seen that the invention is not confined to the mounting of the transmission mechanism within the hub structure of the propellers but the transmission mechanism may readily be positioned between the engine and the propellers. As shown in Fig. 4, the drive shaft 11 terminates in an end 40 which has directly coupled for driving therewith, a plate 41, which carries a gear 42, which gear is the equivalent of the gear 21 of Fig. 3. The gear 42 rotates and/or planetates a pinion 43 which is mounted upon a shaft 44 extending radially from a wheel 45 which is mounted on the drive shaft 46 of the forward propeller 12. The intermediate gear 47 is the equivalent of the gear 25 of Fig. 3 and rotates the pinion 48 carried by the wheel 49 which is directly coupled to the drive shaft 50 of the rear propeller 13. This assemblage also includes the required roller bearings and associated structure therefor, which structure forms no part of the present invention and may be determined by the specific requirements of the apparatus and the desire of the designer.

The operation of this form of the invention is substantially the same as the operation of that form of the invention shown in Fig. 3, the drive however being from the rear to the front, while in Fig. 3 the drive is carried to the front by the shaft 11 and goes rearwardly therefrom. In each instance the speed of rotation of each propeller is oppositely proportional or in inverse ratio to the companion propeller. Thus the efficiency of the associated propellers is maintained constant regardless of variations in their speeds. This is accomplished by the aerodynamics of joint propellers in which they act in substantially the manner of turbine wheels. Thus it will be seen that the invention is not confined to the two propellers here shown, but any desired number of oppositely pitched blades may be provided.

From the foregoing it will be seen that in both its forms or in other equivalent forms, the present invention provides a propulsion mechanism for airplanes which reduces the propeller at a speed reduced from that of the power plant of the airplane. The invention further provides for the rotation in opposite directions, of a plurality of propellers and further it provides an interconnection for driving the propellers whereby they will be oppositely driven at speeds proportional to the load thereon so that the aerodynamic effect between the propellers remains constant, due to the maintaining constant of the relative motion therebetween.

What is claimed is:

1. A propulsion mechanism for airplanes, including a plurality of oppositely pitched propellers, means operable by a single drive shaft for rotating said propellers in opposite directions at inverse speed ratios, said means including a bevel gear carried by said drive shaft, and freely rotatable pinions carried by one of said propellers and meshing with said gear.

2. A propulsion mechanism for airplanes, including a plurality of oppositely pitched propellers, means operable by a single drive shaft for rotating said propellers in opposite directions at inverse speed ratios, said means including a bevel gear carried by said drive shaft, freely rotatable pinions carried by each of said propellers and meshing with said gear, and an intermediate gear meshing with all of said pinions operable to inversely balance the rotation of said propellers by said pinions.

3. A propulsion mechanism for airplanes, including a plurality of oppositely pitched propellers, means operable by a single drive shaft for rotating said propellers in opposite directions at inverse speed ratios, said means including a bevel gear carried by said drive shaft, pinions operatively associated with each of said propellers for controlling the rotation thereof, and intermediate means between said pinions operable to inversely balance the rotation of said propellers by said pinions, said intermediate means including a double-faced bevel gear in constant enmeshment with all of said pinions.

4. In a device of the character described, a drive shaft, a bevel gear carried by said shaft, a pair of hubs carrying propellers mounted for rotation in the axis of said shaft, pinions carried by each of said hubs, and means for driving said pinions for rotary and/or planetary movement by said gear.

5. In a device of the character described, a drive shaft, a bevel gear carried by said shaft, a pair of hubs carrying propellers mounted for rotation in the axis of said shaft, pinions carried by each of said hubs, and means for driving said pinions for rotary and/or planetary movement by said gear, the pinions of one of said hubs being in enmeshment with said gear.

6. In a device of the character described, a drive shaft, a bevel gear carried by said shaft, a pair of hubs carrying propellers mounted for rotation in the axis of said shaft, pinions carried by each of said hubs, means for driving said pinions for rotary and/or planetary movement by said gear, the pinions of one of said hubs being in enmeshment with said gear, and an intermediate freely rotatable gear for rotating and planetating the pinions of the opposite hub.

7. In a device of the character described, a drive shaft, a bevel gear carried by said shaft, a pair of hubs carrying propellers mounted for rotation in the axis of said shaft, pinions carried by each of said hubs, means for driving said pinions for rotary and/or planetary movement by said gear, the pinions of one of said hubs being in enmeshment with said gear, and an intermediate freely rotatable gear for rotating and planetating the pinions of the opposite hub, said intermediate gear being in constant enmeshment with the pinions of both of said hubs.

8. In a device of the character described, a drive shaft, a bevel gear carried by said shaft, a pair of hubs carrying propellers mounted for rotation in the axis of said shaft, pinions carried by each of said hubs, means for driving said pinions for rotary and/or planetary movement by said gear, the pinions of one of said hubs being in enmeshment with said gear, an intermediate freely rotatable gear for rotating and planetating the pinions of the opposite hub, said intermediate gear being in constant enmeshment with the pinions of both of said hubs, and a stationary gear mounted for enmeshment with the pinions of said second hub.

9. In a device of the character described, a drive shaft, a bevel gear carried by said shaft, a pair of hubs carrying propellers mounted for rotation in the axis of said shaft, pinions carried by each of said hubs, means for driving said pinions for rotary and/or planetary movement by said gear, the pinions of one of said hubs being in enmeshment with said gear, an intermediate freely rotatable gear for rotating and planetating the pinions of the opposite hub, said intermediate gear being in constant enmeshment with the pinions of both of said hubs, and a stationary gear mounted for enmeshment with the pinions of said second hub, whereby said hubs will be rotated in opposite direction at inverse speed ratios.

FRANK DONOHUE, Jr.